United States Patent [19]
Arrigoni et al.

[11] Patent Number: 5,124,998
[45] Date of Patent: Jun. 23, 1992

[54] LASER PLASMA TUBE HAVING A WINDOW SEALED END AND A MIRROR SEALED END

[75] Inventors: Marco Arrigoni, Sunnyvale; Gerald C. Barker, Palo Alto; William Kolb, Redwood City; Benjamin Cook, Livermore; Joseph Fraizer, Mountain View, all of Calif.

[73] Assignee: Coherent, Inc., Palo Alto, Calif.

[21] Appl. No.: 525,907

[22] Filed: May 21, 1990

[51] Int. Cl.$^5$ .................................................. H01S 3/03
[52] U.S. Cl. ................................... 372/61; 372/103; 372/98; 372/55; 372/99; 372/107; 372/108; 372/92
[58] Field of Search .................... 372/107, 99, 61, 65, 372/34, 35, 92, 22, 103, 108

[56] References Cited

U.S. PATENT DOCUMENTS

| | | | |
|---|---|---|---|
| 3,617,926 | 11/1971 | Bullinger | 372/65 |
| 3,626,323 | 12/1971 | Ineichen | 372/36 |
| 3,660,778 | 5/1972 | LeBlanc, Sr. | 372/34 |
| 3,772,609 | 11/1973 | Willett et al. | 373/23 |
| 3,783,404 | 1/1974 | Matsuoka | 372/65 |
| 4,232,275 | 11/1980 | Kolb, Jr. | 372/107 |
| 4,250,467 | 2/1981 | Kubota et al. | 372/103 |
| 4,375,688 | 3/1983 | Taguchi | 372/61 |
| 4,376,328 | 3/1983 | Mefferd | 445/28 |
| 4,378,600 | 3/1983 | Hobart | 372/62 |
| 4,397,025 | 8/1983 | Kebabian | 372/29 |
| 4,547,885 | 10/1985 | Allen et al. | 372/58 |
| 4,575,853 | 3/1986 | Jako | 372/61 |
| 4,615,034 | 9/1986 | von Gunten et al. | 372/99 |
| 4,694,463 | 9/1987 | Hirth et al. | 372/65 |
| 4,736,379 | 4/1988 | Barker et al. | 372/34 |
| 4,757,507 | 7/1988 | Wondrazek et al. | 372/99 |
| 4,897,851 | 1/1990 | Vecht et al. | 372/107 |
| 4,920,541 | 4/1990 | Baumgartner et al. | 372/99 |
| 4,961,202 | 10/1990 | Chaffee | 372/100 |

OTHER PUBLICATIONS

Bethea; "Megawatt Power at 1.138 $\mu$ in $Nd^{3+}$:YAG and Simultaneous Oscillation at Both 1.06 and 1.318 $\mu$"; IEEE Journ. Quan. Elect. Feb. 1973.

*Primary Examiner*—Léon Scott, Jr.
*Attorney, Agent, or Firm*—Limbach, Limbach & Sutton

[57] ABSTRACT

A sealed laser plasma tube for use in a gas laser system. A Brewster window seals one end of the tube (the cathode end, in a preferred embodiment), and an end mirror which seals the opposite tube end (the anode end, in a preferred embodiment). In a laser system embodying the invention, a second end mirror is positioned adjacent to, but spaced from, the Brewster window. Intracavity elements may conveniently be inserted and replaced in the region between the sealed Brewster window and the second end mirror. The sealed mirror which seals the tube end opposite the window is preferably coated with at least an outermost layer of Hafnium oxide, to protect it from hard UV radiation originating within the plasma tube. The inventors have recognized that the problem of sealed window degradation is substantially less severe at the cathode end of an ion laser plasma tube, and that the sealed window should be attached at the tube end at which the window degradation problem is less severe.

3 Claims, 3 Drawing Sheets

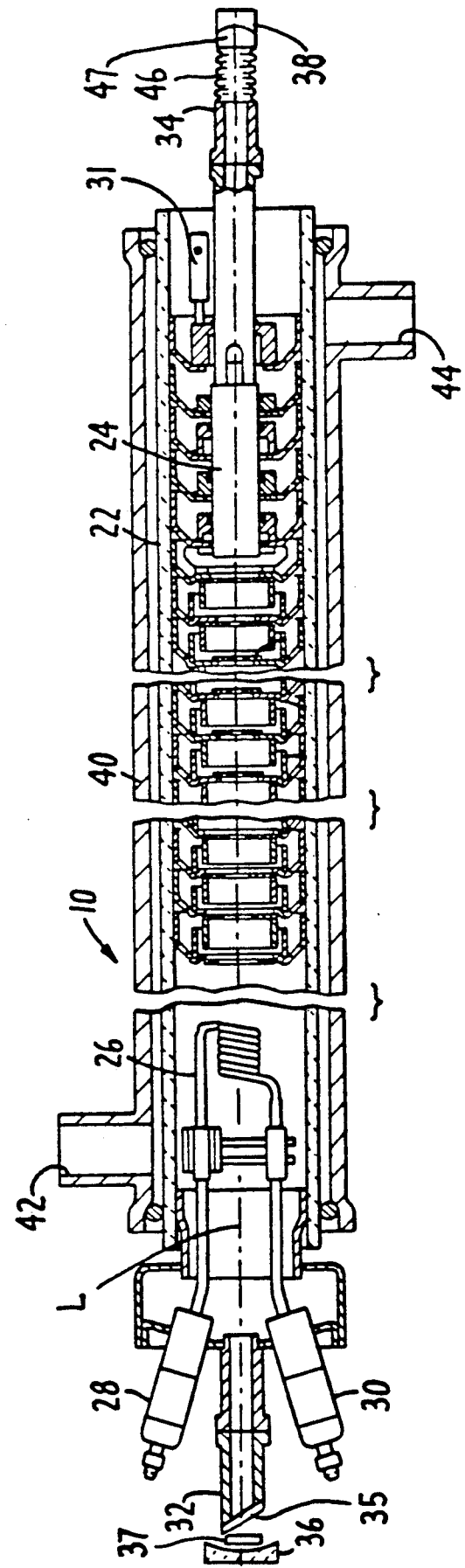

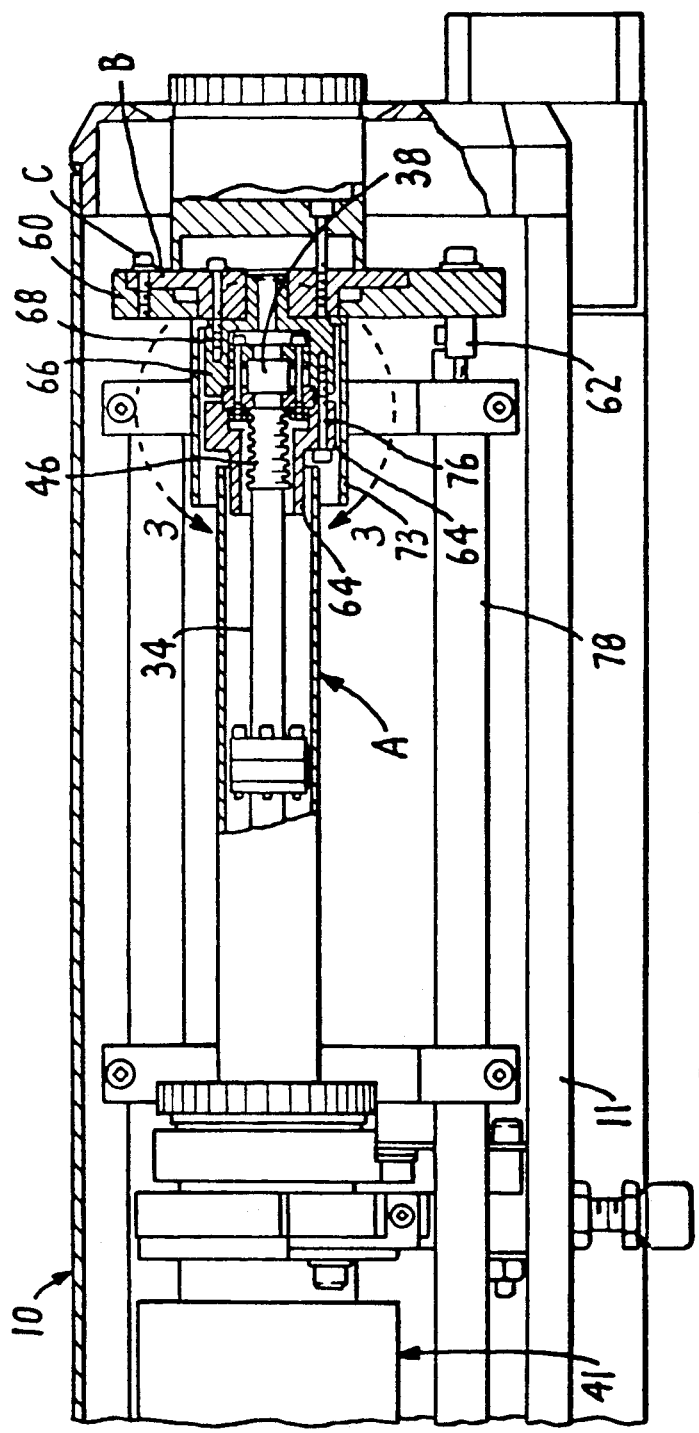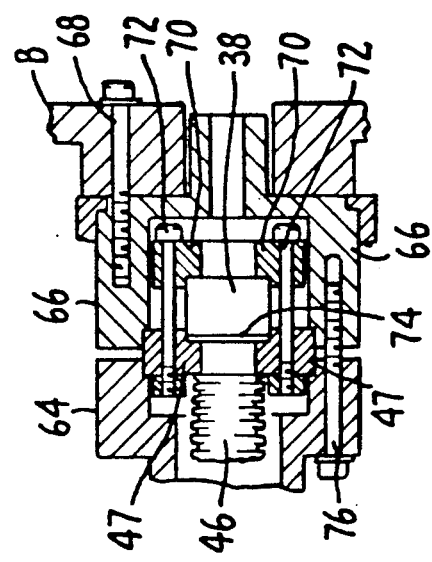

LASER PLASMA TUBE HAVING A WINDOW SEALED END AND A MIRROR SEALED END

TECHNICAL FIELD

The invention relates to a sealed plasma tube for use in a gas laser system, having a Brewster window which seals one end of the tube, and an end mirror which seals the opposite tube end.

BACKGROUND OF THE INVENTION

Conventional gas lasers include a sealed plasma tube for confining a gaseous lasing medium. In a first class of conventional gas lasers, both ends of the plasma tube are sealed with Brewster windows (transmissive elements oriented with respect to the laser beam at the Brewster angle). Throughout the specification, including in the claims, the term "window" will be used in a broad sense to denote any transmissive element which is impervious to the flow of gas.

In the mentioned first class of gas laser systems, the end mirrors defining the ends of the optical cavity are mounted outside the plasma tube, at locations spaced from the Brewster windows. Thus, the optical cavity is not completely sealed, and intra-cavity beam control elements such as wavelength selecting prisms, single frequency etalons, acousto-optic or electro-optic modulators, nonlinear crystals for second harmonic generation, mode control devices (such as aperture wheels having several different hole sizes), polarizing elements, and the like, may be conveniently positioned in the non-sealed portion of the optical cavity between the Brewster windows and the end mirrors.

However, conventional lasers in this first class have two important disadvantages. The materials comprising the Brewster windows are directly exposed to the harsh plasma tube environment, and particularly, to hard UV radiation produced by electrical discharge in the extremely low pressure plasma tube atmosphere. As the windows absorb hard UV radiation over time, their optical characteristics degrade in two principal respects. First, their transmissivity decreases with time. Second, the distortions they induce into the transmitted laser beam become increasingly severe with time.

A protective coating could be applied to the window to shield the window from hard UV radiation. However, such a protective coating would need to be extremely thin (typically less than about 100 Angstroms) in order to keep to an acceptably low level the loss the coating introduces into the beam. Such a thin coating does not provide a long lasting protection to the window. On the other hand, it is impractical to coat a sealed Brewster window with a sufficiently thick coating to protect it from the damaging UV radiation.

For example, due to the mentioned problems, conventional ion laser plasma tubes of the described type (tubes sealed at each end with Brewster windows) have short lifetimes, typically in the range from about 1000 hours to about 1200 hours when operated at full power in the ultraviolet wavelength region.

It will be appreciated that another significant disadvantage of the first class of conventional plasma tubes (sealed at both ends with Brewster windows) is that the Brewster windows introduce unavoidable losses into the laser system, since they inevitably transmit less than 100 percent of the radiation incident thereon (due to manufacturing flaws and imperfect alignment, among other reasons).

In a second class of conventional gas laser systems, a substantially totally reflective mirror is attached directly to one end of the plasma tube and a partially reflective mirror is attached directly to the other end of the plasma tube, to define a sealed laser optical cavity. This approach eliminates the problems discussed above that are associated with sealed windows. However, this class of gas laser systems is subject to the important disadvantage that, because the optical cavity is completely and permanently sealed, intra-cavity beam control elements cannot conveniently be positioned within and removed from the optical cavity.

Previously, it had not been known how to solve the above-mentioned problems of Brewster window degradation (and corresponding short plasma tube lifetime) and optical losses due to use of Brewster windows, while at the same time permitting convenient insertion and replacement of intra-cavity beam control elements.

SUMMARY OF THE INVENTION

The invention is a sealed laser plasma tube for use in a gas laser system. The inventive tube includes a Brewster window which seals one end of the tube (the cathode end, in a preferred embodiment), and an end mirror which seals the opposite tube end (the anode end, in a preferred embodiment). In a laser system embodying the invention, a second end mirror is positioned adjacent to, but spaced from, the Brewster window (often referred to herein as the "sealed" window). Intra-cavity elements may conveniently be inserted and replaced in the region between the sealed window and the second end mirror.

The reflective coating of the end mirror sealed onto the tube end opposite the window (the reflective coating of the "sealed" mirror) is preferably designed to have at least its outermost layer composed of Hafnium oxide (or another UV resistant material), to protect the mirror from hard UV radiation originating within the plasma tube.

The inventors have recognized that the problem of sealed window degradation is typically more severe at the anode end of an ion laser plasma tube (particularly, an ion laser plasma tube containing Argon, Krypton, or a mixture thereof). The sealed window should be attached at the tube end at which the window degradation problem is less severe. Accordingly, the window should be attached at the cathode end of an ion laser plasma tube.

Even in embodiments in which the sealed mirror of the invention is attached at the plasma tube end subject to less severe degradation, the invention results in reduced optical losses (relative to the losses that would result in conventional laser plasma tubes having sealed windows at both ends), and also permits convenient insertion and replacement of intra-cavity beam control elements.

Preferably, a flexible bellows is attached between the sealed mirror and the rest of the plasma tube, so that the flexing of bellows enables the sealed mirror to translate and tilt freely with respect to the tube's longitudinal axis without destroying the vacuum seal confining the gaseous lasing medium within the tube. This embodiment permits a sealed mirror having different coatings on different portions of its surface to be translated relative to the laser beam, to expose any desired one of the coatings to the beam.

The sealed mirror can be either a partially reflective output mirror (i.e., an output coupler), or a highly reflective mirror. In the latter case, an output end mirror should be positioned in the beam path near the sealed window. In the former case, a highly reflective mirror should be positioned in the beam path near the sealed window.

BRIEF DESCRIPTION OF THE DRAWINGS

FIG. 1 is a simplified side cross-sectional view of a gas laser system embodying the invention.

FIG. 2 is an enlarged side cross-sectional view of an end portion of the laser plasma tube of FIG. 1.

FIG. 3 is an enlarged side cross-sectional view of a portion of the FIG. 2 assembly.

DETAILED DESCRIPTION OF THE PREFERRED EMBODIMENTS

Figure 4:
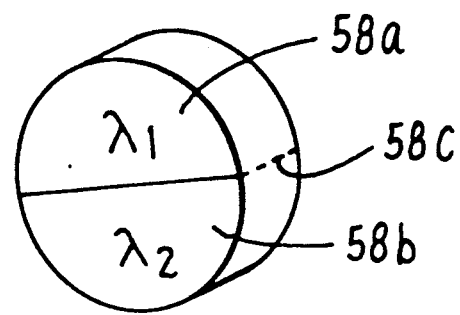
FIG. 4 is a perspective view of an end mirror of the type employed in a preferred embodiment of the invention.

FIG. 1 is a simplified side cross-sectional view of a conduction cooled gas laser tube and cavity assembly 10, which includes a ceramic tube 22 for confining a gaseous lasing medium (which may include Argon, Krypton, or some other gas or mixture of gases). Water jacket 40 surrounds tube 22. Jacket 40 has an inlet 42 and an outlet 44, so that coolant liquid may be pumped from inlet 42, through the annular region between jacket 40 and tube 22, and out through outlet 44. Gas laser systems including a ceramic tube and water jacket of the type shown in FIG. 1, and which are capable of being modified in accordance with the present invention, are described in U.S. Pat. No. 4,736,379, issued Apr. 5, 1988, to Barker, et al., and U.S. Pat. No. 4,378,600, issued Mar. 29, 1983, to Hobart, both of which patents are incorporated herein by reference.

At one end of tube 22, window assembly 32 (which includes Brewster angle window 35) provides a vacuum seal to maintain the purity of the gaseous lasing medium within tube 22. End mirror 36 is positioned near window 35.

At the other end of tube 22, mirror mounting member 34 and end mirror 38 ("sealed" mirror 38) attached to member 34 provide a vacuum seal to maintain the purity of the gaseous lasing medium within tube 22. One end of flexible bellows 46 is attached to the end of member 34, and metal mirror mounting flange 47 is attached (preferably by a brazing operation) to the other end of bellows 46. Sealed mirror 38 is mounted to the end of flange 47 (preferably with a gasket or O-ring seal of the type to be described below) compressed between flange 47 and mirror 38. Thus, sealed mirror 38 is mounted in such a manner that the flexing of bellows 46 enables mirror 38 to translate and tilt with respect to longitudinal axis L of tube 22 without destroying the vacuum seal confining the gaseous lasing medium within tube 22.

To generate laser radiation within the optical cavity, the gas within tube 22 is excited in a conventional manner to the necessary energy level by electrical discharge between cathode assembly 26 and anode assembly 24. Cathode assembly 26 includes electrical connectors 28 and 30, which may be connected to a power supply. The electrical connection to anode assembly 24 is made at pin 31.

We have recognized that the problem of sealed window degradation is substantially less severe at either the anode end or the cathode end of a laser plasma tube, so that the sealed window should be attached at the end at which the window degradation problem is less severe.

In the case that the laser plasma tube contains Argon, Krypton, or a mixture of these two elements (i.e., where the laser plasma tube is for use in an Argon or Krypton noble gas ion laser), we have found that the window degradation problem is significantly less (typically, an order of magnitude less) severe at the cathode end, due to a number of factors including higher plasma tube pressure near the cathode. Thus, in this class of embodiments, sealed mirror 38 should seal the anode end of plasma tube 22 rather than the cathode end.

Sealed mirror 38 is preferably coated with Hafnium oxide on at least the outermost layer, to protect it from hard UV radiation originating within plasma tube 22. The term "outermost" here denotes the last of a series of reflective coating layers applied sequentially to the mirror (so that in FIG. 1, the "outermost" layer of mirror 38 would be the reflective coating layer nearest to flange 47). Alternatively, UV resistant layers other than Hafnium oxide may be coated on at least the outermost surface of mirror 38.

An intra-cavity element 37 is positioned (for convenient replacement) in the non-sealed portion of the laser's optical cavity between sealed window 35 and end mirror 36. Element 37 may comprise one or more of a variety of elements, including wavelength selecting optics, single frequency etalons, acousto-optic or electro-optic modulators, nonlinear crystals for second harmonic generation, mode control devices (such as aperture wheels having several different hole sizes), and polarizing elements.

In FIG. 1, either one of mirrors 36 and 38 may be the (partially transmissive) output mirror.

FIG. 2 is a detailed view of the anode end portion of the assembly shown in simplified form in FIG. 1. FIG. 3 is a detail of the circled portion of the FIG. 2 assembly.

Tube/magnet assembly 41, which is made up of tube assembly 22 and jacket 40, is rigidly mounted to the laser head 11. Cylindrical mirror mounting member 34 is attached to tube 22 in such manner that a gaseous laser medium is sealed within the volume enclosed by tube 22 and member 34. Flexible bellows 46 is sealingly fitted onto the right end of member 34, and metal mounting flange 47 is brazed onto the right end of bellows 46. Elements 47, 64, 66, and 68 and mounting plate B are rigidly mounted to plate 60.

Insulator tube A and assembly insulator 73 as well as insulating clamp portions 64 and 66 protect the user from the voltage potential of the laser tube 22.

As best shown in FIG. 3, insulating clamp portion 64 is screwed onto insulating clamp portion 66 to rigidly capture metal flange 47 by one or more screws 76 (only one of which is shown for simplicity). Mirror 38 and indium gasket 74 are clamped between metal flange 47 and mirror retaining clamp 70 by tightening set of screws 72. As screws 72 are tightened, the mirror assembly (including mirror 38, gasket 74, and clamp 70) is pressed against flange 47, so as to provide a vacuum seal to maintain the purity of the gaseous laser medium. Indium gasket can be very thin, for example, 0.003 inches thick in one preferred embodiment.

For high power applications (typically 5 Watts or more in a system of the type shown in FIG. 1) an Indium gasket 74 (or alternatively, a rubber O-ring) is necessary. For such high power applications, the sealed mirror 38 should be made of fused silica, or some other material having a high figure of merit for the ratio TC/TE, where TE is thermal expansion and TC is thermal conductivity. Materials with a low figure of merit tend to deform as they absorb part of the laser beam and therefore induce beam distortion. Mirrors composed of fused silica (or other materials having a high figure of merit) cannot be fritted, and thus need to be mounted with an Indium gasket (or O-ring seal), to achieve a vacuum seal.

Mirror adjustment plate 60 is attached to mounting plate B by one or more screws C (only one of which is shown for simplicity). Adjustment screws 62 (only one of which is shown for simplicity) are mounted to mirror adjustment plate 60 and are in contact with frame 78. Advancement and retraction of each screw 62 controls the angular orientation of plate 60 (and hence mirror 38 rigidly attached thereto) relative to frame 78 (and hence relative to the longitudinal axis of tube 22).

Means to be discussed below with reference to FIG. 5 (but not shown in FIG. 2 or 3) are preferably provided to translate mirror 38 (and flex bellows 46) perpendicular to the common longitudinal axis of tube 22 (and hence perpendicular to the beam path).

In a preferred embodiment, the surface of mirror 38 adjacent to indium gasket 74 has an outermost coating designed to protect the mirror from hard UV radiation. Preferably, the outermost coating is of Hafnium oxide of thickness in range from about 500 Angstroms to about 5000 Angstroms. Typically, mirror 38 has a multi-layer reflective coating of alternating quarter wavelength layers of high and low refractive index material comprising 5-20 layers. The Hafnium oxide layer is coated on at least the outermost layer of the multi-layer reflective coating.

With a relatively thick protective coating of the type described on sealed mirror 38, the lifetime of the plasma tube assembly of FIGS. 1-3 is at least in the range 4000-5000 hours (when operated at an ultraviolet wavelength). This is much longer than the typical lifetime (1000 hours to 1200 hours) of conventional ion laser plasma tubes that are sealed at both ends with Brewster windows, and that are operated at the same wavelength as the inventive device.

To achieve wavelength selectivity, sealed mirror 38 of the plasma tube assembly of the invention includes two or more surface regions, each having a reflective coating selective to a different wavelength (or group of wavelengths), and the plasma tube assembly includes means for translating the mirror to align any desired one of the reflective coatings with respect to the tube longitudinal axis.

For example, in the FIG. 4 embodiment, mirror 38 has two surface regions separated by central plane 58c. One surface region has multilayer coating 58a and the other has multilayer coating 58b. In the case that mirror 38 is to be used as an output mirror, coating 58a may be designed to partially transmit output beam radiation having a first wavelength (or group of wavelengths), lambda$_1$, and coating 58b may be designed to partially transmit output beam radiation having a second wavelength (or group of wavelengths), lambda$_2$.

Figure 5:
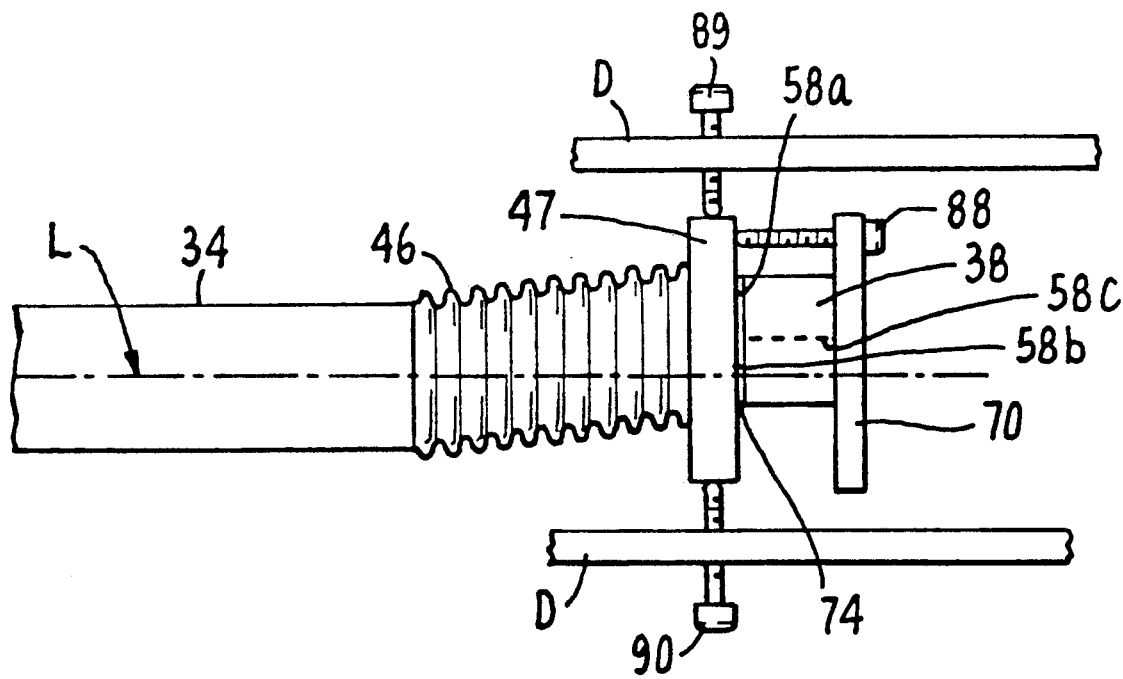
FIG. 5 is a partial side cross-sectional view of a variation on the laser plasma tube end portion of FIG. 2.

In FIG. 5, mirror 38 is mounted in an alternative version of the laser plasma tube end assembly of FIG. 2. Mirror 38 is clamped between flange 47 and mirror retaining clamp 70, which clamped elements are fastened together by screw 88. Flexible bellows 46 is sealingly attached to flange 47.

Adjustment screws 89 and 90, which extend through fixed housing D, are provided for translating mirror 38 in directions perpendicular to the beam path without destroying the vacuum seal confining the gaseous lasing medium within member 34 and bellows 46. The beam path coincides with common longitudinal axis L of housing D and member 34. Screws 89 and 90 must be of some suitable insulating material (i.e., plastic) to protect the user from the voltage potential of the laser tube. Fixed housing D is rigidly mounted to mounting plate B (shown in FIGS. 2 and 3).

If screw 90 is advanced and screw 89 retracted until mirror 38 reaches the position shown in FIG. 5 (with central plane 58c vertically above axis L), the beam will be incident at multilayer coating 58b. In this configuration, the laser output beam will have primary wavelength lambda$_2$. If then screw 90 is retracted and screw 89 advanced until central plane 58c of mirror 38 reaches a position vertically below axis L), the beam will be incident at multilayer coating 58a. In this latter configuration, the laser output beam will have primary wavelength lambda$_1$. Bellows 46 will flex to accommodate translation of the mirror assembly (comprising components 38, 47, 70, and 88) between the described positions.

Of course, variations on mirror 38 may have more than two different surface coatings. In such cases, the inventive device should include means (such as three or more adjustment screws through housing D) for translating the window to expose the beam to any of the surface coatings.

It is contemplated that in some embodiments, the inventive laser plasma tube will not include cathode and anode assemblies. For example, a lasing medium within inventive laser plasma tube may be excited by RF radiation, rather than by cathode/anode means. In all embodiments, however, the inventive laser plasma tube has a sealed window at a first end and a sealed mirror at a second end.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A sealed laser comprising:
   A sealed cylindrical tube formed from an electrically insulating material;
   a plurality of spaced apart, axially aligned heat conducting members located within the tube and having a radially outer rim brazed to the inner surface of the tube, each member having a central aperture region formed from a sputter resistent material, each said member further including a cylindrical shield axially extending toward an adjacent member, said member further including a plurality of gas return holes located radially outside said shield;
   an anode extending into the tube adjacent one end thereof;
   a first resonator mirror sealably connected to said one end of the tube;
   a cathode extending into the tube adjacent the other end thereof; · a Brewster window sealably connected to said othe end of the tube;

a second resonator mirror mounted beyond the end of said tube and aligned with the Brewster window, said resonator mirrors defining a resonant cavity;

beam control means located between said Brewster window and said second resonator mirror;

a lasing gas within said sealed tube, said gas being at least one member selected from the group consisting of argon, krypton, and mixtures thereof; and means for supplying energy to said cathode and anode to excite said lasing gas to generate laser light, said excitation causing said gas to migrate within the tube such that the gas pressure near the anode is less than the gas pressure near the cathode such that said sealed first resonator mirror increases the lifetime of said laser while said Brewster window permits use of said beam control means to vary beam characteristics within said cavity.

2. The laser of claim 1, wherein the sealed mirror has at least an outermost coating designed to protect the sealed mirror from hard UV radiation originating within the tube.

3. The laser of claim 2, wherein the coating is a layer of Hafnium oxide having thickness in range from 500 Angstroms to 5000 Angstroms.

* * * * *